US008578475B2

(12) United States Patent
Awata

(10) Patent No.: US 8,578,475 B2
(45) Date of Patent: Nov. 5, 2013

(54) IMAGE FORMING APPARATUS, USER AUTHENTICATION SYSTEM, CONTROL PROGRAM AND COMPUTER-READABLE STORAGE MEDIUM FOR OPERATING IMAGE FORMING APPARATUS

(75) Inventor: Satoshi Awata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1542 days.

(21) Appl. No.: 11/974,872

(22) Filed: Oct. 16, 2007

(65) Prior Publication Data

US 2008/0092231 A1 Apr. 17, 2008

(30) Foreign Application Priority Data

Oct. 17, 2006 (JP) ................................. 2006/283124

(51) Int. Cl.
*G06F 21/00* (2013.01)

(52) U.S. Cl.
USPC ............................... 726/19; 713/176; 726/27

(58) Field of Classification Search
None
See application file for complete search history.

(56) References Cited

U.S. PATENT DOCUMENTS

| 6,764,000 | B1 | 7/2004 | Graham |
| 7,124,934 | B2 | 10/2006 | Graham |
| 7,769,801 | B2 * | 8/2010 | Shudo ............................ 709/201 |
| 2005/0010530 | A1 * | 1/2005 | Kakutani et al. ................. 705/57 |
| 2005/0265744 | A1 * | 12/2005 | Uruta ............................... 399/80 |
| 2006/0077119 | A1 | 4/2006 | Zhang et al. |
| 2006/0218643 | A1 * | 9/2006 | DeYoung ......................... 726/26 |
| 2007/0019229 | A1 * | 1/2007 | Matsuhara ..................... 358/1.15 |
| 2008/0008318 | A1 * | 1/2008 | Kinoshita ....................... 380/217 |

FOREIGN PATENT DOCUMENTS

| JP | 7-244639 A | 9/1995 |
| JP | 2001-300130 A | 10/2001 |
| JP | 2002-358135 A | 12/2002 |
| JP | 2003-030726 A | 1/2003 |
| JP | 2003-509751 A | 3/2003 |
| JP | 2003-242123 A | 8/2003 |
| JP | 2004-058410 A | 2/2004 |
| JP | 2004-280285 A | 10/2004 |
| JP | 2005-14591 A | 1/2005 |
| JP | 2005-135373 A | 5/2005 |
| JP | 2005-228310 A | 8/2005 |
| JP | 2005-234665 A | 9/2005 |
| JP | 2006-085641 A | 3/2006 |
| JP | 2006-108922 A | 4/2006 |
| JP | 2006-261832 A | 9/2006 |
| JP | 2007-043702 A | 2/2007 |

* cited by examiner

*Primary Examiner* — Gilberto Barron, Jr.
*Assistant Examiner* — Izunna Okeke
(74) *Attorney, Agent, or Firm* — Edwards Wildman Palmer LLP; David G. Conlin; Stephen D. LeBarron

(57) ABSTRACT

An image forming apparatus extracts, from image data, authentication data by which a user is identified, sends the extracted authentication data to a control terminal that recognizes a function available to the user identified by the extracted authentication data, and then receives, from the control terminal, available-function data indicative of a result of the recognition. Then, the image forming apparatus chooses, in accordance with the available-function data thus received, a function that is available in the image forming apparatus. This enables the image forming apparatus to validate or invalidate each function in accordance with a user on the basis of the extracted authentication data.

15 Claims, 7 Drawing Sheets

FIG. 5 (a)

| USER | AUTHENTICATION DATA | AVAILABLE FUNCTIONS | | | |
|---|---|---|---|---|---|
| | | COPY | Scan To E-Mail | FAX | INTERNET FAX |
| TANAKA | FIG. 6(a) | ○ | ○ | ○ | ○ |
| SATO | FIG. 6(b) | × | ○ | ○ | ○ |
| YAMADA | FIG. 6(c) | × | × | ○ | × |
| WHEN THERE ARE PLURAL PIECES OF AUTHENTICATION DATA | | FUNCTION AVAILABLE TO ANY ONE OF EXTRACTED USERS CAN BE USED | | | |

FIG. 5 (b)

| USER | AUTHENTICATION DATA | AVAILABLE FUNCTIONS | | | |
|---|---|---|---|---|---|
| | | COPY | Scan To E-Mail | FAX | INTERNET FAX |
| TANAKA | FIG. 6(a) | ○ | ○ | ○ | ○ |
| SATO | FIG. 6(b) | × | ○ | ○ | ○ |
| YAMADA | FIG. 6(c) | × | × | ○ | × |
| WHEN THERE ARE PLURAL PIECES OF AUTHENTICATION DATA | | FUNCTION AVAILABLE TO ANY ONE OF EXTRACTED USERS CAN BE USED | | | |

FIG. 5 (c)

| USER | AUTHENTICATION DATA | ORDER OF PRIORITY | AVAILABLE FUNCTIONS | | | |
|---|---|---|---|---|---|---|
| | | | COPY | Scan To E-Mail | FAX | INTERNET FAX |
| TANAKA | FIG. 6(a) | 2 | ○ | ○ | ○ | ○ |
| SATO | FIG. 6(b) | 1 | × | ○ | ○ | ○ |
| YAMADA | FIG. 6(c) | 3 | × | × | ○ | × |

FIG. 5 (d)

| AUTHENTICATION DATA USER (POSITION) | ORDER OF PRIORITY | AVAILABLE FUNCTIONS | | | |
|---|---|---|---|---|---|
| | | COPY | Scan To E-Mail | FAX | INTERNET FAX |
| MANAGER | 1 | ○ | ○ | ○ | ○ |
| LEADER | 2 | ○ | ○ | × | × |
| PERSON IN CHARGE | 3 | ○ | × | × | × |

US 8,578,475 B2

IMAGE FORMING APPARATUS, USER AUTHENTICATION SYSTEM, CONTROL PROGRAM AND COMPUTER-READABLE STORAGE MEDIUM FOR OPERATING IMAGE FORMING APPARATUS

This Nonprovisional application claims priority under 35 U.S.C. §119(a) on Patent Application No. 283124/2006 filed in Japan on Oct. 17, 2006, the entire contents of which are hereby incorporated by reference.

FIELD OF THE INVENTION

The present invention relates to an image forming apparatus that limits available functions in accordance with users who use the image forming apparatus, a user authentication system, and a control program and computer-readable storage medium for operating an image forming apparatus.

BACKGROUND OF THE INVENTION

In recent years, a copy-machine system has been built in which (i) a multifunction printer (MFP) having a combination of two or more functions such as a print function, a copy function, a scanning function, and a facsimile function and (ii) a control terminal (sever PC) are linked with each other via a network so that the MFP is controlled. Further, some MFPs are provided with a function of limiting users to specific MFP functions.

Disclosed in connection with such a limitation imposed on users is a technique of limiting users' operation by using a server PC to analyze authentication data extracted from a document. For example, Patent Document 1 (Japanese Unexamined Patent Application Publication No. 509751/2003 (Tokuhyo 2003-509751; published on Mar. 11, 2003)) discloses a method of verifying the authenticity of a document by making a comparison between (i) an identifying feature/seal read out by scanning the document and (ii) information stored in a database. Further, for example, Patent Document 2 (Japanese Unexamined Patent Application Publication No. 14591/2005 (Tokukai 2005-14591; published on Jan. 20, 2005) discloses a system in which a printer receives print data containing user information, sends the user information to a printer control terminal together with an authentication request, and carries out printing in accordance with the print data upon receiving authentication notification from the printer control terminal.

SUMMARY OF THE INVENTION

However, the techniques respectively disclosed in Patent Documents 1 and 2 can only invalidate all the functions in cases where the disqualification of a user is verified by analyzing authentication data obtained from image data. Further, those techniques give no consideration to a case where the image data contains plural pieces of authentication data.

The present invention has been made in view of the foregoing problems, and it is an object of the present invention to realize an image forming apparatus that can validate or invalidate each function in accordance with users by analyzing authentication data. Further, it is another object of the present invention to realize an image forming apparatus that makes it possible to appropriately limit functions even in cases where image data contains plural pieces of authentication data.

In order to achieve the foregoing objects, an image forming apparatus according to the present invention includes: reading means for reading a document as image data; extracting means for extracting, from the image data, authentication data by which a user is identified; communication means for sending the authentication data to an image forming apparatus control terminal that recognizes a function available to the user identified by the authentication data, and for receiving, from the image forming apparatus control terminal, available-function data indicative of a result of the recognition; and available-function choosing means for choosing, in accordance with the available-function data thus received, a function that is available in the image forming apparatus.

Further, in order to achieve the foregoing objects, a user authentication system according to the present invention includes: the image forming apparatus described above; and an image forming apparatus control terminal that receives authentication data, extracted from the image forming apparatus, by which a user is identified, that recognizes a function available to the user identified by the authentication data, and that sends, to the image forming apparatus, available-function data indicative of a result of the recognition.

According to such an image forming apparatus as arranged above and the system, authentication data by which a user is identified is extracted from the image data, and the authentication data thus extracted is sent to an image forming apparatus control terminal that recognizes a function available to the identified uses. The image forming apparatus control terminal uses the authentication data to recognize a function available to a user who can be identified. Therefore, upon receiving available-function data indicative of a result of the recognition, the image forming apparatus can choose, in accordance with the available-function data, a function that is available in the image forming apparatus. The term "authentication data" here refers to any data by which a user can be identified (specified) at the image forming apparatus control terminal. Examples of the authentication data include seal image data obtained by reading a seal.

Thus, the arrangement and the system make it possible to choose an available function in accordance with a user identified by authentication data. This makes it possible to validate or invalidate each function of the image forming apparatus in accordance with a user.

This allows users to use a function of the image forming apparatus only by causing the image forming apparatus to read a document. When the document contains authentication data corresponding a holder of the document (e.g., when the document has a seal put thereto as authentication data), even a user who is different from the holder is allowed to use a function of the image forming apparatus on behalf of the holder.

Further, in order to achieve the foregoing objects, an image forming apparatus according to the present invention includes: reading means for reading a document as image data; communication means (a) for sending the image data to an image forming apparatus control terminal that extracts, from the image data, authentication data by which a user is identified, and that recognizes a function available to the user identified by the authentication data, and (b) for receiving, from the image forming apparatus control terminal, available-function data indicative of a result of the recognition; and available-function choosing means for choosing, in accordance with the available-function data thus received, a function that is available in the image forming apparatus.

Further, in order to achieve the foregoing objects, a user authentication system according to the present invention includes: the image forming apparatus described above; and an image forming apparatus control terminal that receives the image data created by the image forming apparatus, that extracts, from the image data, authentication data by which a user is identified, that recognizes a function available to the user identified by the authentication data, and that sends, to the image forming apparatus, available-function data indicative of a result of the recognition.

According to such an image forming apparatus as arranged above and the system, the image data is sent to the image forming apparatus control terminal. The image forming apparatus control terminal extracts, from the image data, authentication data by which a user is identified, and recognizes a function available to the user identified by the extracted authentication data. Therefore, upon receiving available-function data indicative of a result of the recognition, the image forming apparatus can choose, in accordance with the available-function data, a function that is available in the image forming apparatus.

Thus, the arrangement and the system makes it possible to choose an available function in accordance with a user identified by authentication data. This makes it possible to validate or invalidate each function of the image forming apparatus in accordance with a user.

This allows users to use a function of the image forming apparatus only by causing the image forming apparatus to read a document. When the document contains authentication data corresponding a holder of the document (e.g., when the document has a seal put thereto as authentication data), even a user who is different from the holder is allowed to use a function of the image forming apparatus on behalf of the holder.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 5(a) through 5(d) are diagrams each showing an example of a user authentication table.

DESCRIPTION OF THE EMBODIMENTS

Figure 1:
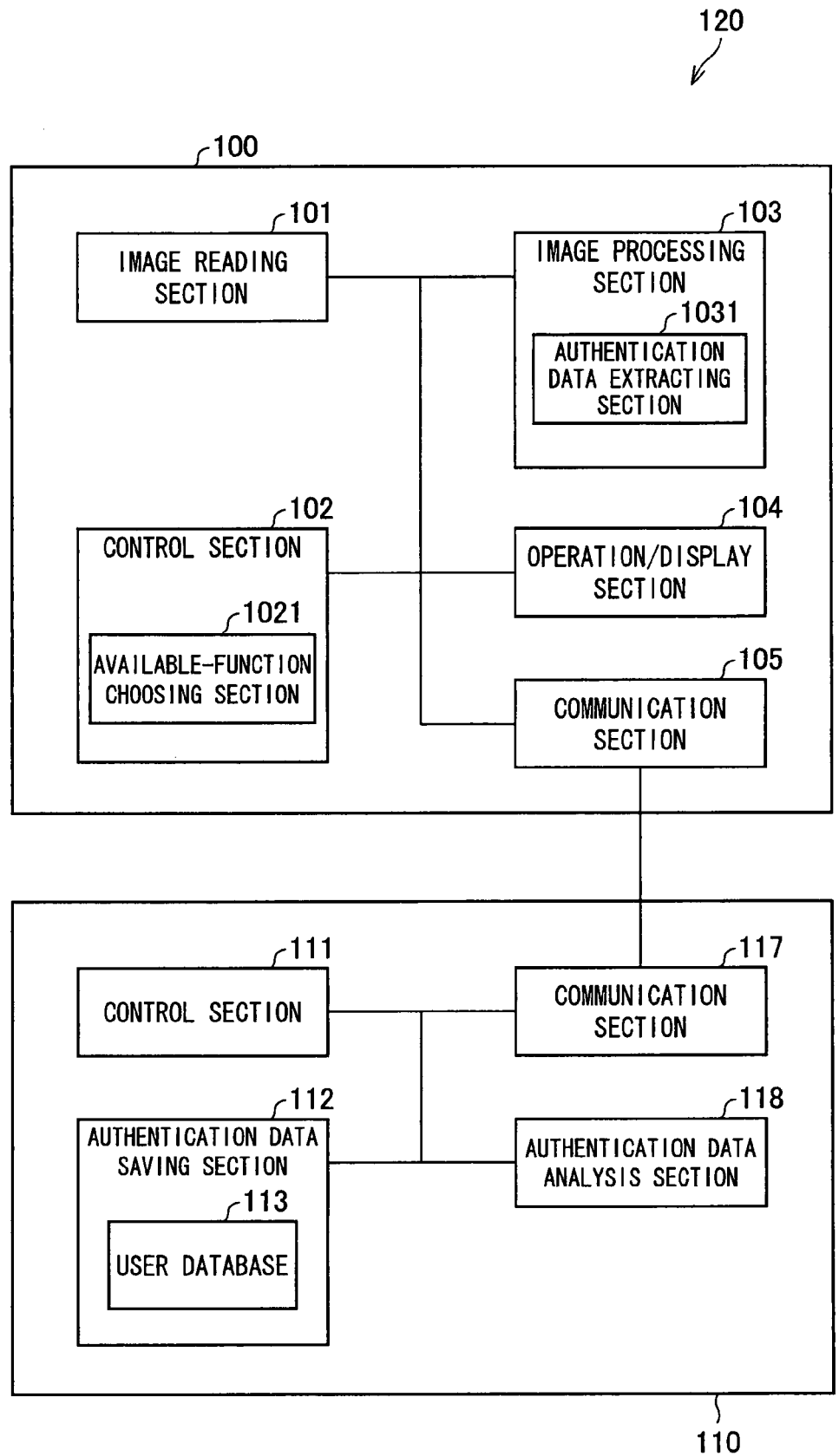
FIG. 1 is a block diagram showing a structure of a user authentication system including an image forming apparatus according to an embodiment of the present invention.

An embodiment of the present invention will be described below with reference to FIGS. 1 through 4. An image forming apparatus according to the present embodiment is a multi-function printer (MFP) that can read documents. Further, the image forming apparatus is controlled by a PC (personal computer) serving as a control terminal. FIG. 1 is a block diagram showing a structure of a main part of the image forming apparatus 100 and a structure of a main part of the control terminal (image forming apparatus control terminal) 110. As shown in FIG. 1, the present embodiment is such that the image forming apparatus 100 and the control terminal 110 constitute an authentication system 120.

The image forming apparatus 100 includes an image reading section (reading means) 101, a control section (control means) 102, an image processing section 103, an operation/display section 104, and a communication section (communication means) 105.

The image reading section 101 is a block that creates image data by reading a document.

The control section (control means) 102 is a block that exercises control over the operation of each of the components of the image forming apparatus 100 in accordance with a computer program. Further, the control section 102 includes an available-function choosing section (available-function choosing means) 1021 that chooses, in accordance with available-function data received from the control terminal 110 via the communication section 105, a function that is available in the image forming apparatus 100. The available-function data will be described later.

The image processing section 103 is a block that performs various types of image processing under the control of the control section 102 in response to a user's input sent from the operation/display section 104 or in response to an external input. Further, the image processing section 103 includes an authentication data extracting section 1031 that extracts, from the image data created by the image reading section 101, authentication data by which a user is identified. The term "authentication data" here refers to any data that enables the control terminal 110 to identify a user (to specify a user). Examples of the authentication data may include seal image data obtained by reading a seal.

The operation/display section 104 provides a user with a user interface. The operation/display section 104 is a block that displays various screens, various manual operation buttons, and the like; receives operation input signals, sent from a user via the displayed manual operation buttons, which causes the image forming apparatus 100 to be set or to be given operation instructions; and sends the operation input signals to the control section 102. The operation/display section 104 is constituted, for example, by a flat display panel such as a liquid crystal display element. The operation/display section 104 is here realized as a touch panel, but may be provided with separate operation and display sections.

The communication section (communication means) 105 is a block that communicates with the outside, or with the control terminal 110 in particular. The communication may take the form of cable communication or wireless communication, and there may be provided a dedicated line for use in communication with the control terminal 110. Here, for example, the communication section 105 exchanges commands with the control terminal 110, sends the extracted authentication data to the control terminal 110, and receives the available-function data from the control terminal 110.

The control terminal 110 includes a control section 111, an authentication data saving section 112, a communication section 117, and an authentication data analysis section 118.

The control section 111 exercises control over the operation of each of the components of the control terminal 110 in accordance with a computer program.

The communication section 117 is a block that communicates with the outside, or with the image forming apparatus 100 in particular. The communication section 117 exchanges commands with the image forming apparatus 100, receives the authentication data from the image forming apparatus 100, and sends the available-function data to the image forming apparatus 100.

The authentication data analysis section 118 is a block that recognizes, in accordance with the authentication data received by the communication section 117, a function that is available to a user identified by the authentication data. The authentication data saving section 112 contains a user database (user authentication table) 113 that correlates, with each user identified by the authentication data, a function that is available in the image forming apparatus 100. The authentication data analysis section 118 performs the recognition in accordance with the user database 113 and the received authentication data. Examples of the function that is available to the user, i.e., of the available function include, but are not limited to, a copy function, a Scan To E-Mail function of sending read image data as an e-mail, a FAX function, and an Internet FAX function of sending mail to which image data has been attached, and may include any function that is available in the image forming apparatus 100.

A process that is carried out in the authentication system 120 will be described below with reference to the flow charts respectively shown in FIGS. 2 through 4. In each of the flow charts respectively shown in FIGS. 2 and 3, users identified by authentication data are not arranged in order of priority. Each of the flow charts respectively shown in FIGS. 2 and 3 explains a process of making available a function of the image forming apparatus which function is available to any one of the users, or of making available a function of the image forming apparatus which function is available to all the authenticated users.

First, the operation/display section 104 displays a message that encourages reading of a document for use in user authentication. A user places the document on the image reading section 101 of the image forming apparatus 100, and then carries out an input that instructs the image reading section 101 to read the document (e.g., presses a scan button). Then, the image reading section 101 reads the document as image data (S200). Next, the image forming apparatus 100 uses the image processing section 103 to extract authentication data from the image data (S201). Then, the authentication data is sent from the communication section 105 to the control terminal 110 (S202).

In the control terminal 110, the communication section 117 receives the authentication data, and the authentication data analysis section 118 judges whether or not the authentication data includes plural pieces of authentication data (S203). When the authentication data analysis section 118 judges that the authentication data does not include plural pieces of authentication data (i.e., is a single piece of authentication data) (NO in S203), the authentication data analysis section 118 analyzes the authentication data (S204). Then, as a result of the analysis of the authentication data, the authentication data analysis section 118 judges whether user information (being herein supposed to be a user name) corresponding to the authentication data is contained in the user database 113 saved in the authentication data saving section 112 (S205). In cases where the authentication data analysis section 118 judges that such user information is contained in the user database 113 (YES in S205), the authentication data analysis section 118 extracts available-function information corresponding to the user information (S207). This means that the authentication data analysis section 118 recognizes a function that is available to a user identified by the received authentication data.

Then, the available-function information (information on the available function thus recognized) extracted in S207, i.e., available data is sent from the communication section 117 of the control terminal 110 to the communication section 105 of the image forming apparatus 100 (S208).

In cases where the authentication data analysis section 118 judges, as a result of the analysis of the authentication data, that no user information corresponding to the authentication data is contained in the user database 113 saved in the authentication data saving section 112 (NO in S205), the authentication data analysis section 118 generates such available data that it is recognized that all the functions of the image forming apparatus 100 are disabled (S206). Then, the data is sent from the communication section 117 of the control terminal 110 to the communication section 105 of the image forming apparatus 100 (S208).

Then, in the image forming apparatus 100, the available-function choosing section 1021 of the control section 102 analyzes the available data received by the communication section 105, thereby choosing a function that is available in the image forming apparatus 100. The operation/display section 104 displays a result accordingly (S209). Here, on receipt of such available data that it is recognized that all the functions are disabled, it is decided that all the functions are disabled. In other words, it is decided that all the functions are invalid. The operation/display section 104 displays a result accordingly. Further, if there is an available function, the operation/display section 104 indicates that the function is available.

After having chosen an available function, the image forming apparatus 100 processes, within a range of available functions, the document read in S200. For example, in cases where the image forming apparatus 100 reads a statement of final decision (document) containing "YAMADA" SEAL ⊕ (authentication data), the image forming apparatus 100 may permit the user to send the statement of final decision to another apparatus via FAX or Internet FAX, but may prohibit the user from sending the statement of final decision via Scan To E-Mail, which is vulnerable to theft of information, or from duplicating (copying) the statement of final decision. Furthermore, the available functions may include print functions such as an N-up function, a double face printing function, and a stapling function. For example, in cases where the image forming apparatus 100 reads an important document (document) containing "MANAGER" SEAL (authentication data), the image forming apparatus 100 may prohibit an N-up function and a double face printing function with respect to the important document, and may permit only a color printing function with respect to the important document.

Figure 3:
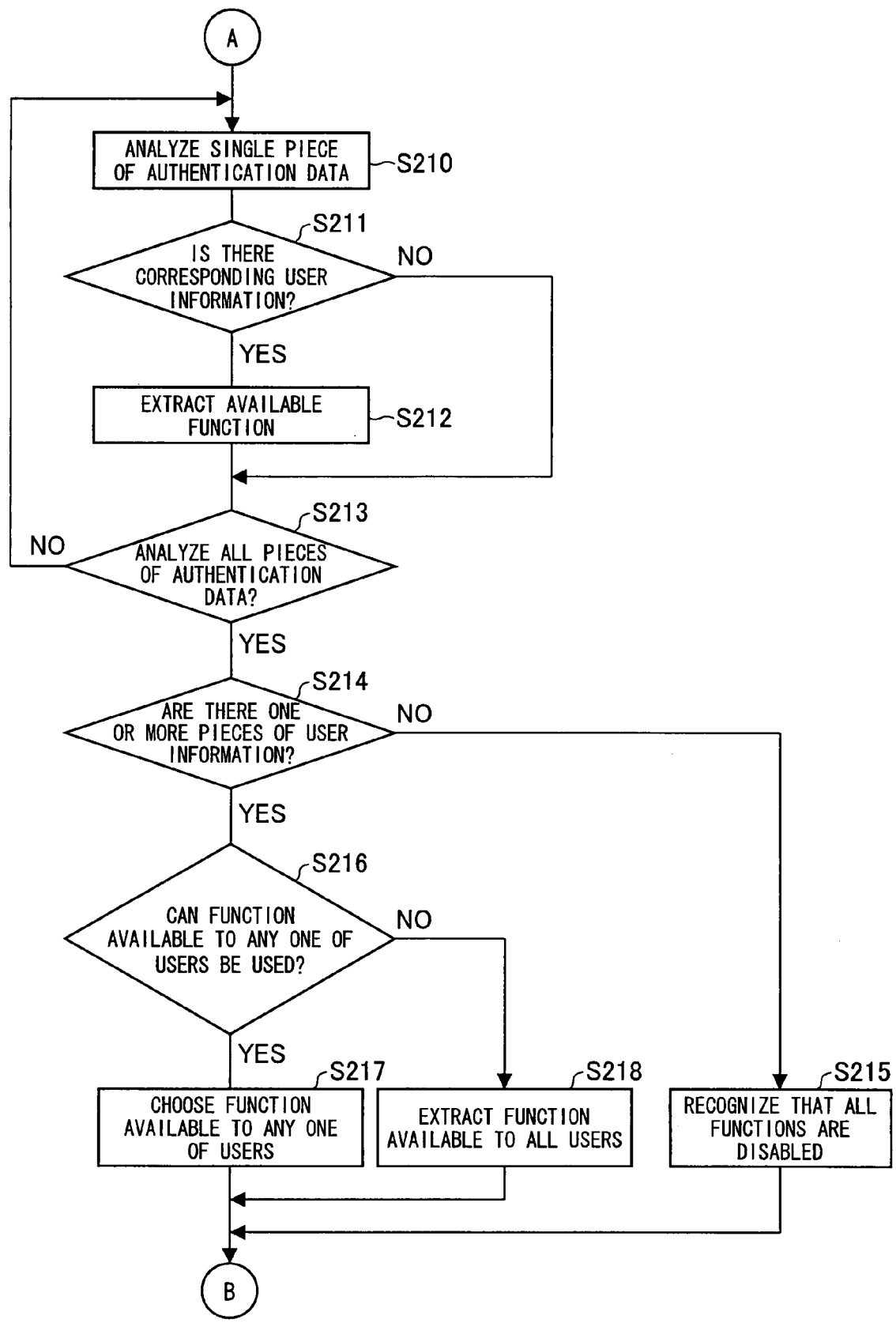
FIG. 3 is a flow chart, showing a flow of a process that branches off from the flow chart of FIG. 2, which applies to a case where users are not arranged in order of priority.

Alternatively, when the authentication data analysis section 118 judges, in S203, that the authentication data received by the communication section 117 includes plural pieces of authentication data (YES in S203), the authentication data analysis section 118 analyzes each of the plural pieces of authentication data as shown in FIG. 3 (S210). As a result of the analysis, the authentication data analysis section 118 judges whether or not user information corresponding the authentication data is contained in the user database 113 saved in the authentication data saving section 112 (S211). In cases where the authentication data analysis section 118 judges that such user information is contained in the user database 113 (YES in S211), the authentication data analysis section 118 extracts an available function correlated with the user information (S212). In cases where the authentication data analysis section 118 judges, as a result of the analysis, that no user information corresponding to the authentication data is contained in the user database 113 saved in the authentication data saving section 112 (NO in S211), nothing is carried out and the process proceeds to S213.

Then, the authentication data analysis section 118 judges whether or not all the pieces of authentication data have been analyzed (S213). In cases where not all the pieces of authentication data have been analyzed (NO in S213), the process returns to S210, in which the authentication data analysis section 118 analyzes the next piece of authentication data.

In cases where all the pieces of authentication data have been analyzed (YES in S213), the authentication data analysis section 118 judges whether or not there is user information corresponding to any one of the pieces of the authentication data (S214).

Figure 2:
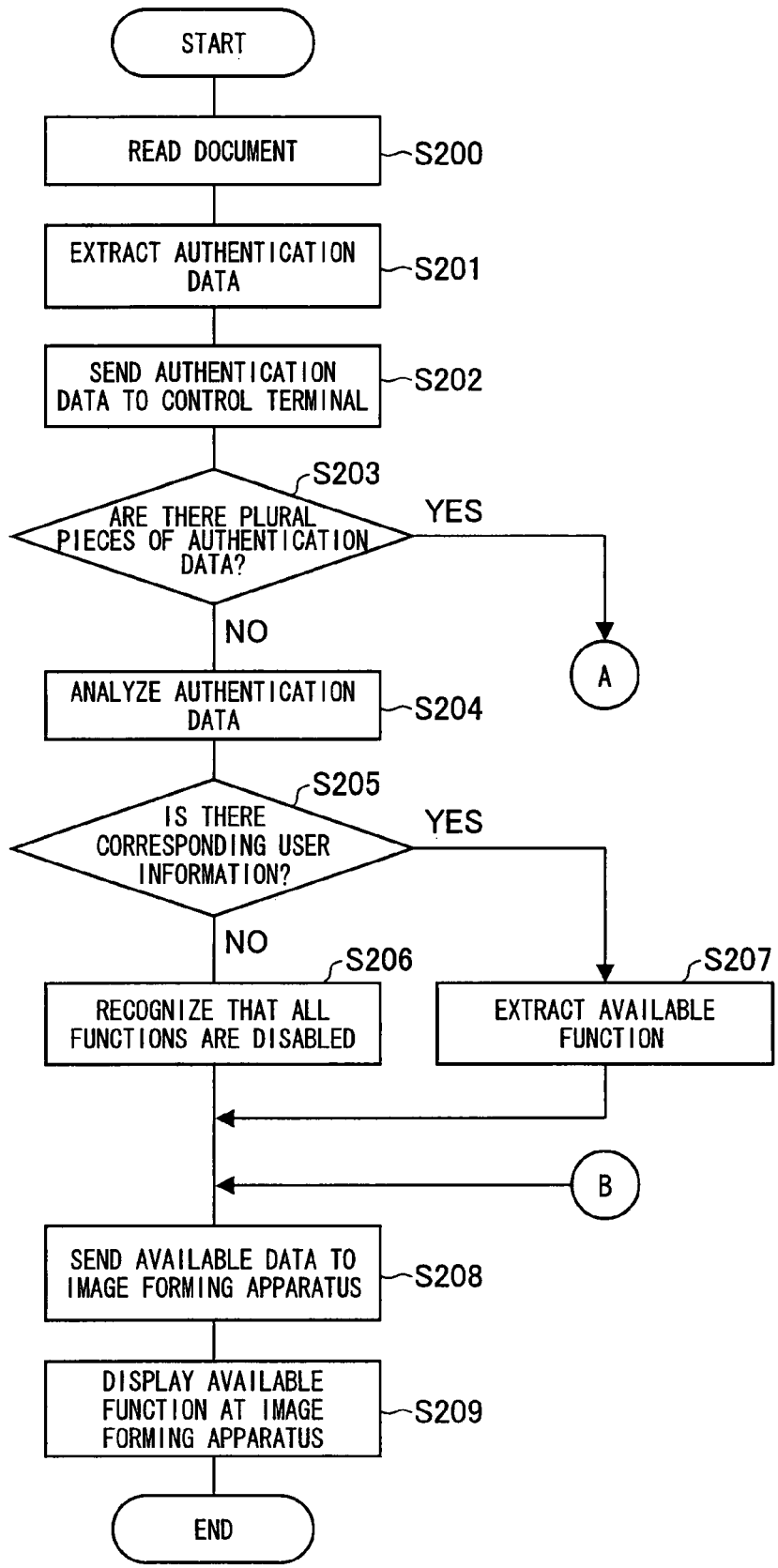
FIG. 2 is a flow chart showing a flow of a basic process that is carried out in the authentication system.

In cases where none of the pieces of authentication data matches user information saved in the user database 113 of the authentication data saving section 112 (NO in S214), the authentication data analysis section 118 generates such available data that it is recognized that all the functions of the image forming apparatus 100 are disabled (S215), and the process proceeds to S208 of FIG. 2 so that the data is sent to the image forming apparatus 100.

In cases where one or more of the pieces of authentication data match user information saved in the user database 113 of the authentication data saving section 112 (YES in S214), the authentication data analysis section 118 judges whether or not the use of a function that is available to any one of the matched users is permitted (S216). In cases where the authentication data analysis section 118 judges that the use of a function that is available to any one of the matched users is permitted (YES in S216), the authentication data analysis section 118 extracts all the functions that are assigned to each user identified by the authentication data (S217). Then, the authentication data analysis section 118 generates such available data that it is recognized that those functions are available, and the process proceeds to S208 of FIG. 2 so that the data is sent to the image forming apparatus 100.

If the use of a function that is not available to all the users identified by the authentication data is prohibited (i.e., if the use of a function that is available to all the users is permitted) (NO in S216), the authentication data analysis section 118 extracts functions that are available to all the users identified by the authentication data (S218). Then, the authentication data analysis section 118 generates such available data that it is recognized that those functions are available, and the process proceeds to S208 of FIG. 2 so that the data is sent to the image forming apparatus 100.

This is the end of the process that is carried out in the authentication system 120.

A process that is carried out when authentication data are arranged in order of priority will be described below with reference to the flow charts respectively shown in FIGS. 2 and 4.

The steps S200 through S209 of FIG. 2 are the same as those described above. When the authentication data analysis section 118 judges, in S203, that the authentication data includes plural pieces of authentication data, the authentication data analysis section 118 analyzes each of the plural pieces of authentication data as shown in FIG. 4 (S221). As a result of the analysis, the authentication data analysis section 118 judges whether or not user information corresponding to the authentication data is contained is the user database 113 saved in the authentication data saving section 112 (S222). In cases where the authentication data analysis section 118 judges that such user information is contained in the user database 113 (YES in S222), the authentication data analysis section 118 extracts an available function correlated with the user information (S223). In cases where the authentication data analysis section 118 judges, as a result of the analysis, that no user information corresponding to the authentication data is contained is the user database 113 saved in the authentication data saving section 112 (NO in S222), nothing is carried out and the process proceeds to S224.

Then, the authentication data analysis section 118 judges whether or not all the pieces of authentication data have been analyzed (S224). In cases where not all the pieces of authentication data have been analyzed (NO in S224), the process returns to S221, in which the authentication data analysis section 118 analyzes the next piece of authentication data.

In cases where all the pieces of authentication data have been analyzed (YES in S224), the authentication data analysis section 118 judges whether or not there is user information corresponding to any one of the pieces of authentication data (S225).

In cases where none of the pieces of authentication data matches user information saved in the user database 113 of the authentication data saving section 112 (NO in S225), the authentication data analysis section 118 generates such available data that it is recognized that all the functions of the image forming apparatus 100 are disabled (S227). Then, the process proceeds to S208 of FIG. 2 so that the data is sent to the image forming apparatus 100.

In cases where the authentication data matches user information saved in the user database 113 of the authentication data saving section 112 (YES in S225), the authentication data analysis section 118 extracts, from user priority recorded in the user database 113 of the authentication data saving section 112, available-function information corresponding to a user given the highest priority (S226). Then, the authentication data analysis section 118 generates such available data that it is recognized that a function corresponding to a user given the highest priority is available, and the process proceeds to S208 of FIG. 2 so that the data is sent to the image forming apparatus 100.

Figure 4:
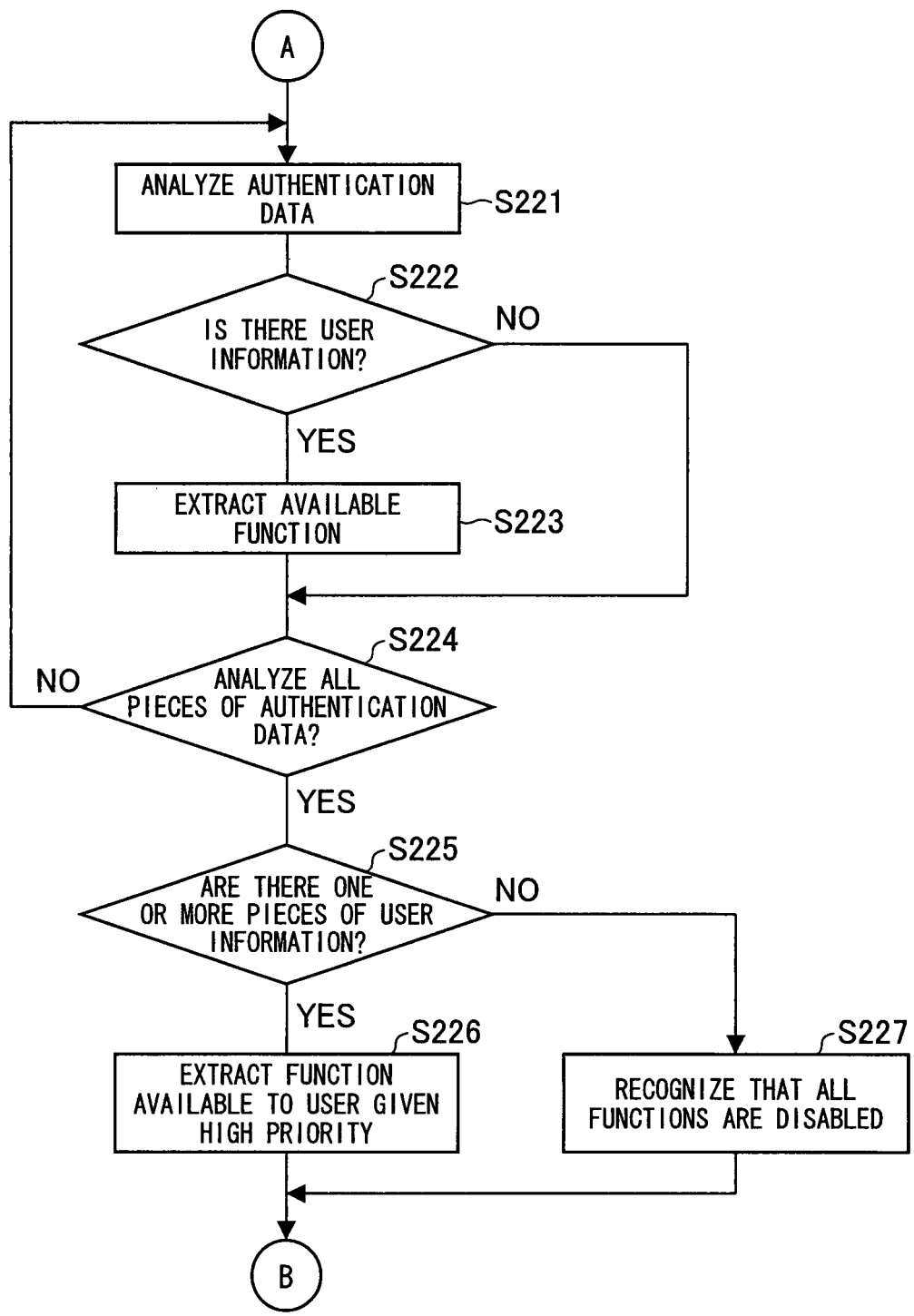
FIG. 4 is a flow chart, showing a flow of a process that branches off from the flow chart of FIG. 2, which applies to a case where users are arranged in order of priority.
Figure 6:
FIGS. 6(a) through 6(c) are diagrams each showing an example of authentication data.
Figure 6:
Figure 6:
Figure 7:
FIGS. 7(a) through 7(d) are diagrams each showing an example of a document containing authentication data.

Note that the process described with reference to FIGS. 2 through 4 is carried in the entire authentication system 120. The steps S200 to S202 and S209 are taken in the image forming apparatus 100, and the steps S203 to S208, S210 to S218, and S221 to S227 are taken in the control terminal 110.

Specific embodiments using the authentication system 120 will be described below with reference to FIGS. 5(a) through 7(d).

Assume that the user authentication table (user database) of FIG. 5(a) is stored in the control terminal 110. Note that FIGS. 6(a) through 6(c) show authentication data corresponding to authentication data of FIGS. 5(a) through 5(c), respectively. In cases where the image forming apparatus 100 reads the document of FIG. 7(a), the image forming apparatus 100 extracts "TANAKA" SEAL ● as authentication data, and then chooses "COPY", "SCAN TO E-MAIL", "FAX", and "INTERNET FAX" as available functions with reference to FIGS. 5(a) and 6(a) through 6(c).

In cases where the user authentication table of FIG. 5(a) is stored in the control terminal 110 and the image forming apparatus 100 reads the document of FIG. 7(b), the image forming apparatus 100 extracts "SATO" SEAL ● and "YAMADA" SEAL ● as authentication data. Here, in cases where there are plural pieces of authentication data, a function that is available to any one of the extracted users is made available. Therefore, the image forming apparatus 100 chooses "SCAN TO E-MAIL", "FAX", and "INTERNET FAX" as available functions with reference to FIG. 5(a) and FIGS. 6(a) through 6(c).

In case where the user authentication table of FIG. 5(b) is stored in the control terminal 110 and the image forming apparatus 100 reads the document of FIG. 7(b), the image forming apparatus 100 extracts "SATO" SEAL ● and "YAMADA" SEAL ● as authentication data. Here, in cases where there are plural pieces of authentication data, a function that is available to all the extracted users is made available. Therefore, the image forming apparatus 100 chooses "FAX" as an available function with reference to FIG. 5(b) and FIGS. 6(a) through 6(c).

In case where the user authentication table of FIG. 5(c) is stored in the control terminal 110 and the image forming apparatus 100 reads the document of FIG. 7(b), the image forming apparatus 100 extracts "SATO" SEAL ● and "YAMADA" SEAL ● as authentication data. FIG. 5(c) and FIGS. 6(a) through 6(c) show that the user "SATO" is given higher priority than the user "YAMADA". Therefore, the image forming apparatus 100 chooses "SCAN TO E-MAIL", "FAX", and "INTERNET FAX" as available functions.

In case where the user authentication table of FIG. 5(d) is stored in the control terminal 110 and the image forming apparatus 100 reads the document of FIG. 7(c), the image forming apparatus 100 extracts "PERSON IN CHARGE" as authentication data. The image forming apparatus 100 chooses "COPY" as an available function with reference to FIG. 5(d).

In case where the user authentication table of FIG. 5(d) is stored in the control terminal 110 and the image forming apparatus 100 reads the document of FIG. 7(d), the image forming apparatus 100 extracts "PERSON IN CHARGE" and "MANAGER" as authentication data. FIG. 5(d) shows that "MANAGER" is given higher priority than "PERSON IN CHARGE". Therefore, the image forming apparatus 100 chooses "COPY", "SCAN TO E-MAIL", "FAX", and "INTERNET FAX" as available functions.

The descriptions contained in the present embodiment are not limited to those contained above, and can be appropriately varied within the spirit of the present invention. For example, although the present embodiment is such that the image forming apparatus 100 extracts authentication data, the control terminal 110 may extract authentication data from image data created by the image reading section 101 of the image forming apparatus 100 and sent to the control terminal 110. In this case, the authentication data analysis section 118 of the control terminal 110 carries out the process of extracting authentication data.

Further, the present embodiment is not limited in terms of a format of data exchanged between the image forming apparatus 100 and the control terminal 110. An available example of the format is XML or SOAP. Such a format makes it easy to create and analyze data. Further, encrypted data may be sent. In this case, the image forming apparatus 100 includes, in addition to the components described above, encrypting/decrypting means for encrypting or decrypting data.

Further, the present embodiment is not limited in terms of a range within which an available function chosen by the available-function choosing section 1021 is used. However, such an available function may only be used with respect to a document used for extracting authentication data. Moreover, after the function has been performed with respect to the document, it is possible to cause the operation/display section 104 to automatically display a display screen that indicates an authentication mode (i.e., a mode dictating that a document containing authentication data be placed on the image reading section).

Further, each of the blocks of the image forming apparatus 100, especially the control section 102 and the image processing section 103, may be constituted by hardware logic, or by software with use of a CPU as follows.

That is, the image forming apparatus 100 has: (i) the CPU (central processing unit) for executing an instruction of control program realizing various functions; (ii) a ROM (read only memory) storing the program; (iii) a RAM (random access memory) for expanding the program; (iv) a storage device (storage medium) such as a memory storing the program and various data; and (v) the like. The object of the present invention also can be achieved by (i) providing, for the image forming apparatus 100, a storage medium storing, in a computer readable manner, a program code (executable program; intermediate code; source program) of the control program for the present system, and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a floppy® disk and a hard disk; (iii) optical disks such as a compact disk read only memory (CD-ROM), a magnetic optical disk (MO), a mini disk (MD), a digital video disk (DVD), and a CD-Rewritable (CD-R); (iv) cards such as an IC card (inclusive of a memory card) and an optical card; and (v) semiconductor memories such as a mask ROM, an EPROM (electrically programmable read only memory), an EEPROM (electrically erasable programmable read only memory), and a flash ROM.

Further, the image forming apparatus 100 may be connectable to the communication network, and the program code may be supplied via the communication network. The communication network is not particularly limited. Specific examples thereof are: the Internet, Intranet, Extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired channel using an IEEE 1394, a USB (universal serial bus), a power-line communication, a cable TV line, a telephone line, an ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program code, or (ii) a form of a series of data signals.

As described above, an image forming apparatus according to the present invention includes: reading means for reading a document as image data; extracting means for extracting, from the image data, authentication data by which a user is identified; communication means for sending the authentication data to an image forming apparatus control terminal that recognizes a function available to the user identified by the authentication data, and for receiving, from the image forming apparatus control terminal, available-function data indicative of a result of the recognition; and available-function choosing means for choosing, in accordance with the available-function data thus received, a function that is available in the image forming apparatus.

Further, in order to achieve the foregoing objects, a user authentication system according to the present invention includes: the image forming apparatus described above; and an image forming apparatus control terminal that receives authentication data, extracted from the image forming apparatus, by which a user is identified, that recognizes a function available to the user identified by the authentication data, and that sends, to the image forming apparatus, available-function data indicative of a result of the recognition.

Further, an image forming apparatus according to the present invention includes: reading means for reading a document as image data; communication means (a) for sending the image data to an image forming apparatus control terminal that extracts, from the image data, authentication data by which a user is identified, and that recognizes a function available to the user identified by the authentication data, and (b) for receiving, from the image forming apparatus control terminal, available-function data indicative of a result of the recognition; and available-function choosing means for choosing, in accordance with the available-function data thus received, a function that is available in the image forming apparatus.

Further, a user identification system according to the present invention includes: the image forming apparatus described above; and an image forming apparatus control terminal that receives the image data created by the image forming apparatus, that extracts, from the image data, authentication data by which a user is identified, that recognizes a function available to the user identified by the authentication data, and that sends, to the image forming apparatus, available-function data indicative of a result of the recognition.

In addition to the foregoing arrangement, the image forming apparatus according to the present invention may be arranged such that: when the image forming apparatus control terminal is able to identify no user by the authentication data, the available-function choosing means decides that all functions of the image forming apparatus are disabled.

According to the foregoing arrangement, in cases where the image forming apparatus control terminal can identify no user by the authentication data, all the functions of the image forming apparatus are disabled (the functions are invalidated). This makes it possible to prevent a user who cannot be identified by the authentication data (e.g., a user who is not registered in the image forming apparatus control terminal) from using the functions of the image forming apparatus. This makes it possible to ensure security in the use of the functions of the image forming apparatus.

In addition to the foregoing arrangement, the image forming apparatus according to the present invention may be arranged such that: when the image forming apparatus control terminal is able to identify a plurality of users by the authentication data, the available-function choosing means decides that a function that is available to any one of the users identified by the authentication data is available.

According to the foregoing arrangement, when the image forming apparatus control terminal can identify a plurality of users by the authentication data, a function that is available to at least one of the users identified by the authentication data is made available to the other users identified by the authentication data. For example, in cases where User A can use Functions C and D, where User B can use only Function C, and where Users A and B can be identified by the authentication data, User B is allowed to use Function D (even when it is User B who has caused the image forming apparatus to read the document).

The phrase "to identify a plurality of users by the authentication data" here may mean "to identify, by plural pieces of authentication data, a plurality of users respectively corresponding the plural pieces of authentication data, or may mean "to identify a plurality of users by a single piece of authentication data". Examples of the latter include the following: In cases where the authentication data indicates Group E, a plurality of users contained in Group E can be identified by the authentication data alone.

In addition to the foregoing arrangement, the image forming apparatus according to the present invention may be arranged such that: when the image forming apparatus control terminal is able to identify a plurality of users by the authentication data, the available-function choosing means decides that a function that is available to all the users identified by the authentication data is available.

According to the foregoing arrangement, when the image forming apparatus control terminal can identify a plurality of users by the authentication data, only a function that is available to all the users identified by the authentication data is made available. For example, in cases where User A can use Functions C and D, where User B can use only Function C, and where Users A and B can be identified by the authentication data, User B can be prevented from using Function D when it is User B who has caused the image forming apparatus to read the document.

In addition to the foregoing arrangement, the image forming apparatus according to the present invention may be arranged such that: when the image forming apparatus control terminal is able to identify, by the authentication data, a plurality of users arranged in order of priority, the available-function choosing means chooses an available function in accordance with the order of priority of the users identified by the authentication data.

According to the foregoing arrangement, the available function is chosen in accordance with the order of priority of the users identified by the authentication data. For example, even if only a given function (e.g., a copy function) can be used in cases where User A can be identified by Authentication Data A contained in a document, another function (e.g., a FAX sending function) can be made available in addition to the function when the document contains Authentication Data B corresponding to User B given higher priority than User A.

In addition to the foregoing arrangement, the image forming apparatus according to the present invention may further include control means for exercising control so that the available function chosen by the available-function choosing means is available only to the document read by the reading means.

The foregoing arrangement makes it possible that the available function chosen by the available-function choosing means is available only to the document read by the reading means. Therefore, even in cases where the authentication data is a seal put on a document and where a user who uses the image forming apparatus is different from a user who has put the seal on the document, the user who has put the seal can be authorized to prevent use of the function for image data other than the document read by the image forming apparatus (to prevent a process from being carried out with respect to image data other than the document).

Further, at least part of the available data may be described with use of XML or SOAP. This makes it easy to create and analyze the available data.

In addition to the foregoing arrangement, the image forming apparatus according to the present invention may further include encrypting/decrypting means for encrypting or decrypting data exchanged between the image forming apparatus and the image forming apparatus control terminal.

The foregoing arrangement makes it possible to send encrypted data, or to decipher received encrypted data by decrypting the data. This makes it possible to prevent falsification and leakage of data.

Incidentally, the image forming apparatus may be realized by hardware, or may be realized by causing a computer to execute a program. Specifically, a program according to the present invention is a program for causing a computer to operate as each means of an image forming apparatus having any one of the arrangements, and the program is stored in a computer-readable storage medium according to the present invention.

When this program is executed by a computer, the computer operates as the image forming apparatus. Therefore, as with the image forming apparatus, each function of the image forming apparatus can be validated or invalidated in accordance with a user on the basis of analyzed authentication data.

Alternatively, an image forming apparatus according to the present invention may be arranged as expressed below. That is, an image forming apparatus according to the present invention may be an image forming apparatus, provided in a system in which the image forming apparatus is communicably connected to an image forming apparatus control terminal for controlling the image forming apparatus, which authenticates each user to a function. The image forming apparatus includes: data reading means for reading a document; authentication data extracting means for extracting authentication data from image data created by the data reading means; and authentication data transmitting means for sending, to the image forming apparatus control terminal, the authentication data extracted by the authentication data extracting means. The image forming apparatus control terminal includes: available-function choosing means for choosing an available function in accordance with the authentication data; and available-function data transmitting means for sending, to the image forming apparatus, the available function chosen by the available-function choosing means. The image forming apparatus further includes available-function choosing means for choosing, in accordance with available-function data received from the available-function transmitting means, a function that is available in the image forming apparatus.

Further, an image forming apparatus according to the present invention may be an image forming apparatus, provided in a system in which the image forming apparatus is communicably connected to an image forming apparatus control terminal for controlling the image forming apparatus, which authenticates each user to a function. The image forming apparatus includes: data reading means for reading a document; and image data transmitting means for transmitting, to the image forming apparatus control terminal, image data created by the data reading means. The image forming apparatus control terminal includes: authentication data extracting means for extracting authentication data from the image data received from the image data transmitting means; available-function choosing means for choosing an available function in accordance with the authentication data extracted by the authentication data extracting means; and available-function data transmitting means for sending, to the image forming apparatus, the available function chosen by the available-function choosing means. The image forming apparatus further includes available-function choosing means for choosing, in accordance with available-function data received from the available-function transmitting means, a function that is available in the image forming apparatus.

Further, in addition to the foregoing arrangement, the image forming apparatus according to the present invention may be arranged such that all functions are invalidated in cases where there are no users who can be authenticated by the authentication data extracted by the authentication data extracting means.

Further, in addition to the foregoing arrangement, the image forming apparatus according to the present invention may be arranged such that in cases where there a plurality of users who can be authenticated by the authentication data extracted by the authentication data extracting means, it is determined that a function that is available to any one of the users is available.

Further, in addition to the foregoing arrangement, the image forming apparatus according to the present invention may be arranged such that in cases where there a plurality of users who can be authenticated by the authentication data extracted by the authentication data extracting means, it is determined that a function that is available to all the users is available.

Further, in addition to the foregoing arrangement, the image forming apparatus according to the present invention may be arranged such that in cases where there a plurality of users who can be authenticated by the authentication data extracted by the authentication data extracting means, an available function is chosen in accordance with an order of priority in which the users are arranged.

Further, in addition to the foregoing arrangement, the image forming apparatus according to the present invention may be arranged such that the available function thus chosen is used only for the document read by the data reading means.

Further, in addition to the foregoing arrangement, the image forming apparatus according to the present invention may be arranged such that at least part of the available-function data transmitting means uses XML or SOAP.

Further, in addition to the foregoing arrangement, the image forming apparatus according to the present invention may be arranged such that the available-function data transmitting means transmits encrypted data.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Note that the present invention can be applied, for example, to an MFP (Multi Function Printer) having functions such as a printer function, a copier function, a scanner function, and a facsimile function.

What is claimed is:

1. An image forming apparatus comprising:
a reading section configured to read a document as image data;
an extracting section configured to extract, from the image data, authentication data by which a plurality of users are identified;
a communication section configured to send the authentication data to an image forming apparatus control terminal that recognizes a function available to the plurality of users identified by the authentication data, and to receive, from the image forming apparatus control terminal, available-function data indicative of a result of the recognition; and
an available-function choosing section configured to choose, in accordance with the available-function data thus received, a function that is available in the image forming apparatus,
wherein the image forming apparatus control terminal identifies, by the authentication data, a plurality of users arranged in order of priority, the available-function choosing section chooses an available function in accordance with the order of priority of the users identified by the authentication data, and the authentication data is seal image data put to the document.

2. An image forming apparatus comprising:
a reading section configured to read a document as image data;
a communication section configured to (a) send the image data to an image forming apparatus control terminal that extracts, from the image data, authentication data by which a plurality of users are identified, and that recognizes a function available to the plurality of users identified by the authentication data, and (b) receive, from the image forming apparatus control terminal, available-function data indicative of a result of the recognition; and an available-function choosing section configured to choose, in accordance with the available-function data thus received, a function that is available in the image forming apparatus, wherein when the image forming apparatus control terminal identifies, by the authentication data, a plurality of users arranged in order of priority, the available-function choosing section chooses an available function in accordance with the order of priority of the plurality of users identified by the authentication data, and the authentication data is seal image data put to the document.

3. The image forming apparatus as set forth in claim 1, wherein when the image forming apparatus control terminal is able to identify no user by the authentication data, the available-function choosing section decides that all functions of the image forming apparatus are disabled.

4. The image forming apparatus as set forth in claim 2, wherein when the image forming apparatus control terminal is able to identify no user by the authentication data, the available-function choosing section decides that all functions of the image forming apparatus are disabled.

5. The image forming apparatus as set forth in claim 1, wherein when the image forming apparatus control terminal is able to identify a plurality of users by the authentication data, the available-function choosing section decides that a function that is available to any one of the users identified by the authentication data is available.

6. The image forming apparatus as set forth in claim 2, wherein when the image forming apparatus control terminal is able to identify a plurality of users by the authentication data, the available-function choosing section decides that a function that is available to any one of the users identified by the authentication data is available.

7. The image forming apparatus as set forth in claim 1, wherein when the image forming apparatus control terminal is able to identify a plurality of users by the authentication data, the available-function choosing section decides that a function that is available to all the users identified by the authentication data is available.

8. The image forming apparatus as set forth in claim 2, wherein when the image forming apparatus control terminal is able to identify a plurality of users by the authentication data, the available-function choosing section decides that a function that is available to all the users identified by the authentication data is available.

9. The image forming apparatus as set forth in claim 1, further comprising control section for exercising control so that the available function chosen by the available-function choosing section is available only to the document read by the reading section.

10. The image forming apparatus as set forth in claim 1, wherein at least part of the available data is described in an XML format or in a SOAP format.

11. The image forming apparatus as set forth in claim 1, further comprising encrypting/decrypting section for encrypting or decrypting data exchanged between the image forming apparatus and the image forming apparatus control terminal.

12. The image forming apparatus as set forth in claim 1, wherein the function that is available in the image forming apparatus includes at least one of a copy function, a Scan To E-Mail function of sending image data as an e-mail, a FAX function, an Internet FAX function of sending mail to which image data has been attached.

13. A user authentication system comprising:

an image forming apparatus which includes (i) a reading section configured to read a document as image data, (ii) an extracting section configured to extract, from the image data, authentication data by which a plurality of users are identified, (iii) a communication section configured to send the authentication data to an image forming apparatus control terminal that recognizes a function available to the plurality of users identified by the authentication data, and receive, from the image forming apparatus control terminal, available-function data indicative of a result of the recognition, and (iv) an available-function choosing section configured to choose, in accordance with the available-function data thus received, a function that is available in the image forming apparatus; and an image forming apparatus control terminal configured to receive authentication data, extracted from the image forming apparatus, by which the plurality of users are identified, that recognizes a function available to the plurality of users identified by the authentication data, and send, to the image forming apparatus, available-function data indicative of a result of the recognition, wherein the image forming apparatus control terminal identifies, by the authentication data, a plurality of users arranged in order of priority, the available-function choosing section chooses an available function in accordance with the order of priority of the plurality of users identified by the authentication data, and the authentication data is seal image data put to the document.

14. A user authentication system comprising:

an image forming apparatus which includes (i) a reading section configured to read a document as image data, (ii) a communication section configured to (a) send the image data to an image forming apparatus control terminal that extracts, from the image data, authentication data by which a plurality of users are identified, and that recognizes a function available to the plurality of users identified by the authentication data, and (b) receive, from the image forming apparatus control terminal, available-function data indicative of a result of the recognition, and (iii) an available-function choosing section configured to choose, in accordance with the available-function data thus received, a function that is available in the image forming apparatus; and an image forming apparatus control terminal configured to receive the image data created by the image forming apparatus, extracts, from the image data, authentication data by which a user is the plurality of users are identified, recognize a function available to the plurality of users identified by the authentication data, and send, to the image forming apparatus, available-function data indicative of a result of the recognition, wherein the image forming apparatus control terminal identifies, by the authentication data, a plurality of users arranged in order of priority, the available-function choosing section chooses an available function in accordance with the order of priority of the plurality of users identified by the authentication data, and the authentication data is seal image data put to the document.

15. A non-transitory computer-readable storage medium storing a control program for operating an image forming apparatus, the image forming apparatus comprising:

program instructions that read a document as image data;

program instructions that extract, from the image data, authentication data by which a user is identified;

program instructions that send the authentication data to an image forming apparatus control terminal that recognizes each function of a plurality of functions available to the user identified by the authentication data, and for receiving, from the image forming apparatus control terminal, available-function data indicative of a result of the recognition; and program instructions that choose, in accordance with the available-function data thus received, a function that is available in the image forming apparatus, the control program causing a computer execute each of the program instructions, wherein the image forming apparatus control terminal identifies, by the authentication data, a plurality of users arranged in order of priority, the program instructions choosing an available function in accordance with the order of priority of the plurality of users identified by the authentication data, and the authentication data is seal image data put to the document.

* * * * *